United States Patent [19]
Chapman, Jr.

[11] Patent Number: 5,152,313
[45] Date of Patent: Oct. 6, 1992

[54] SAFETY APPARATUS FOR DISCONNECTS AND/OR VALVES

[75] Inventor: William H. Chapman, Jr., Scotts Valley, Calif.

[73] Assignee: Semi-Gas Systems, Inc., San Jose, Calif.

[21] Appl. No.: 851,212

[22] Filed: Mar. 13, 1992

[51] Int. Cl.⁵ .................. F16K 35/00; F16L 35/00
[52] U.S. Cl. .................................... 137/382; 220/724
[58] Field of Search ............. 137/377, 381, 382, 382.5; 220/724, 725, 728, 730; 222/182

[56] References Cited

U.S. PATENT DOCUMENTS

| | | | |
|---|---|---|---|
| 4,103,806 | 8/1978 | White | 220/274 |
| 4,301,828 | 11/1981 | Martin, Jr. | 137/382 |
| 4,600,033 | 7/1986 | Baron | 220/724 |
| 4,629,157 | 12/1986 | Tsuchiya et al. | 137/382.5 |
| 4,637,423 | 1/1987 | Gray | 137/382.5 |

OTHER PUBLICATIONS

Tridex, On-Line Auto Pressure Interlock, Persys Technology Ltd.
Clippard Stainless Steel Cylinder, Catalog 784, 1984, Clippard Instrument Laboratory, Inc.

Primary Examiner—George L. Walton
Attorney, Agent, or Firm—Thomas E. Schatzel

[57] ABSTRACT

The present invention comprises a safety apparatus which includes a means for covering a disconnect valve means and an urging means disposed near the covering means. The urging means urges the covering means to cover the disconnect valve means. The urging means further has a retraction mechanism for retracting the covering means from the disconnect valve means only when an external retracting command activates a retracting force on the retracting mechanism. Therefore, the valve is covered by the covering means and is prevented from being inadvertently operated during a system failure and an unsafe operation condition.

9 Claims, 1 Drawing Sheet

SAFETY APPARATUS FOR DISCONNECTS AND/OR VALVES

BACKGROUND OF THE INVENTION

1. Field of the Invention

This invention relates generally to a safety apparatus to prevent the tampering or inadvertent human error in operating a tank disconnect or a valve under pressure. More particularly, this invention relates to a disconnect and/or valve safety cover operated with a spring extending means which does not retract unless an air flow is flowing through a pneumatic line whereby the disconnects and/or the valves are covered by the safety cover and not operable except under safe operation conditions.

2. Description of the Prior Art

Safety management of processing gases used in the manufacture of semiconductor devices is very important in the integrated circuit (IC) industry. Particularly, a wide variety of toxic, corrosive, or flammable processing gases are used in the integrated circuit fabrication lines. These hazardous gases must be managed in a "fail safe" manner to prevent leakage into uncontrolled areas. Other than the gas pipes used to contain and transmit the gases from the storage tanks, different kinds of disconnects and valves for controlling the flow of gases through these pipe lines are designed and installed with protective features to increase the safety of the gas management programs.

Recently, with the advent of low cost intelligent microprocessors, the operation and control of the valves have been shifting to rely more on electronic sensors and computers. The operation of the entire gas management system may be continuously monitored through a plurality of sensors and controlled by an on-line computer. Safety prevention networks prevent the disconnects and valves from being manually operated unless certain conditions are satisfied. However, for the purposes of maintenance and for a few exceptional operation conditions, disconnects and valves may be provided with a "manual override" option which would allow an operator to bypass the usual protective functions in operating such disconnects and valves. The safety of such gas system could be jeopardized if a manual override is inadvertently set or if someone intentionally overrides the protective measures with an intention to sabotage.

An on-line automatic pressure interlock device is marketed by Persys Technology Ltd., referred to as "TRIDEX on-line auto pressure interlock" which includes an apparatus to prevent inadvertent disconnection of a gas line in a pressurized system, e.g. a cylinder connection in a gas cabinet. The disclosed safety apparatus includes a cap which covers a tank connection such that human errors in disconnecting gas tank connections may be prevented. The cap position is controlled by an interlock controller which uses the pressure transducers to monitor the on-line pressure for controlling the position of the cap. The safety apparatus disclosed by Persys Technology is useful in providing additional protection, however it is not "fail safe". Since the interlock controller relies on the pressure signals from the pressure transducers for controlling the cap position the protection provided by the TRIDEX device may not be available during a power failure or other types of system malfunctions which may render the pressure transducer data to be erroneously measured or received by the interlock controller. The interlock controller itself may fail to properly control the cap. There is still a need to provide a safety apparatus which is fail safe and does not rely on external power source to provide the protection required by a gas management system even in the time of a power failure or system malfunction.

SUMMARY OF THE PRESENT INVENTION

It is therefore an object of the present invention to provide a safety apparatus which is capable of preventing unsafe operation of a disconnect and/or a valve without relying on an external electric power source.

It is another object of this invention to provide a safety apparatus including a spring extending means which naturally urges a safety cover to cover the disconnect and/or the valve thus preventing the disconnect and/or the valve from being inadvertently operated in any individual or combination system failure whereby the safety cover always operates in a fail safe mode.

It is a further object of the present invention to provide a safety apparatus which is simple in design and can be manufactured inexpensively.

It is a further object of the present invention to provide a safety apparatus which can be installed to retrofit most existing disconnects and/or valves without requiring substantial software or hardware changes.

Briefly, in a preferred embodiment, the present invention comprises a safety apparatus which includes a covering means for covering a disconnect and/or a valve and an urging means disposed near the covering means. The urging means urges the covering means to cover the disconnect and/or the valve. The urging means further has a hydraulic retraction mechanism for retracting the covering means from the disconnect and/or the valve only when an external retracting command successfully activates a retracting force on the retracting mechanism. Therefore, the disconnect and/or the valve is covered by the covering means and is prevented from being inadvertently operated in a system failure or under an unsafe operation condition.

An advantage of the present invention is that it provides a safety apparatus which is capable of preventing unsafe operation of a disconnect and/or a valve without relying on an external electric power source.

Another advantage of the present invention is that it provides a safety apparatus including a spring extending means which naturally urges the safety cover to cover the disconnect and/or the valve thus preventing the disconnect and/or the valve from being inadvertently operated in any individual or combination system failure whereby the safety cover always operates in a fail safe mode.

Another advantage of the present invention is that it provides a safety apparatus which is simple in design and can be manufactured inexpensively.

Another advantage of the present invention is that it provides a safety apparatus which can be installed to retrofit most existing disconnects and/or valves without requiring substantial software or hardware changes.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
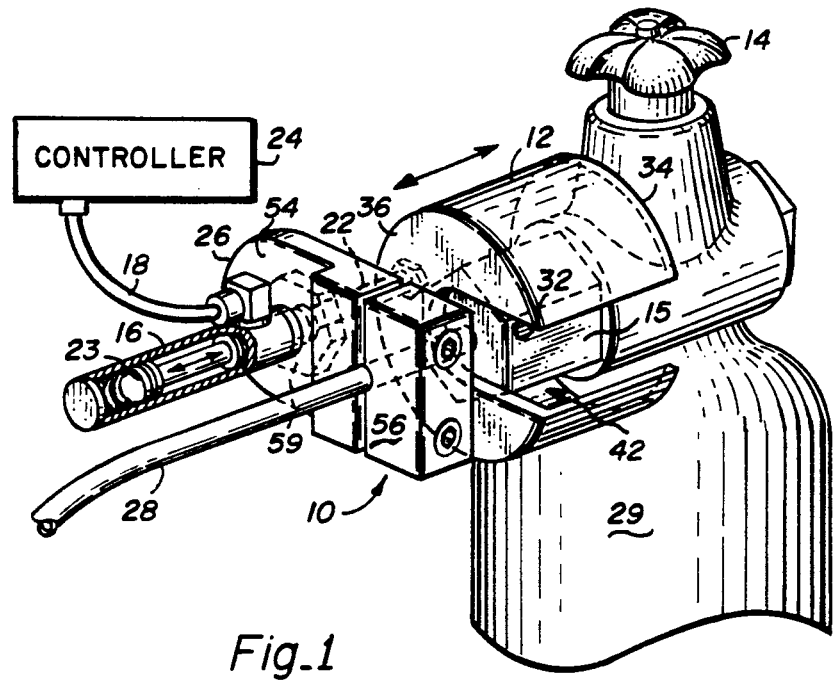
FIG. 1 is a perspective view of a safety apparatus according to the present invention attached to a pigtail pipe near a disconnect and a valve.

FIG. 1 is a perspective view of a safety apparatus according to the present invention and generally referred to by a numeral 10. The safety apparatus 10 comprises a covering means in the form of an elongated semicircular safety cover 12. The safety apparatus 10 further comprises an urging means to axially urge the safety cover 12 as illustrated by the arrow between a first position wherein it covers a tank-pipe disconnect 13 and a second position whereat the valve disconnect 13 is exposed. When in the first position, the disconnect 13 is covered and thereby precluding access by a wrench or other tool. However, when the cover 12 is in the second position, the disconnect 13 is exposed and vulnerable to access by a wrench or other tool. As illustrated herein the safety cover 12 covers only the tank-pipe disconnect 13. However, depending on the application, the safety cover 12 may cover both the disconnect 13 and a valve 14 of a cylinder 15. The urging means includes a pneumatic cylinder 16 connected to a pneumatic line 18, and a spring actuated extending arm 22 which is urged by a spring 23 in turn urging the safety cover 12 to cover the disconnect 13. The cover 12 does not retract unless a pneumatic air flows through the pneumatic line 18 causing the pneumatic cylinder 16 to overcome the force of the spring 23. The pneumatic cylinder 16 is controlled by a gas system controller 24 which controls and activates a pneumatic air to flow through the pneumatic line 18 and thereby sending pneumatic activating commands to the pneumatic cylinder 16. Therefore, disconnect 13 is covered by the safety cover 12 unless the controller 24 issues a pneumatic activating command to retract the safety cover 12. This assures that the safety cover 12 covers the disconnect 13 and/or the valve 14 in the time of a power outage or a pneumatic system failure. The safety apparatus 10 thus operates continuously in a "fail safe" mode without depending on the availability of an external power supply.

In the preferred embodiment, a Clippard stainless steel pneumatic cylinder Model SSR-05-01-1/8 manufactured by Clippared Instrument Laboratory, Inc. is used. The SSR-05-01-1/8 pneumatic cylinder has a threaded rod to fit a ⅛. inch bore, i.e. a bore 25 in FIGS. 2 and 3A, with the extending arm 22 allowing a maximum stroke of one and one-eighth inches. It uses a spring having an urging force of approximately thirteen pounds. The pneumatic flow in line 18 is controlled by controller 24. For those skilled in the art, the internal structure of a pneumatic cylinder, the functions of different components, and the applications to a gas management system are well known. A wide variety of pneumatic cylinders are available as disclosed in Catalog 784 "Clippard Stainless Steel Cylinders", published by Clippard Instrument Laboratory.

The safety apparatus 10 further includes a pipe fixture plate 26 of which the upper portion is attached to the cylinder 16 and the lower portion is attached to a pigtail pipe 28. The pigtail pipe 28 is connected to the disconnect 13 and the valve 14. The pipe fixture plate 26 provides for securely attaching the safety apparatus 10 to a pipe near the disconnect 13 and the valve 14. Therefore, the installation of the safety apparatus 10 to an existing piping system does not require re-routing or configuration changes of the pipes or valves. The pipe fixture plate 26 may be conformed to fit the existing piping and valve arrangements and positions such that the safety apparatus 10 protects the associated disconnect 13 and/or the valve 14 from being tampered or inadvertently operated.

Figures 2, 3A, 3B:
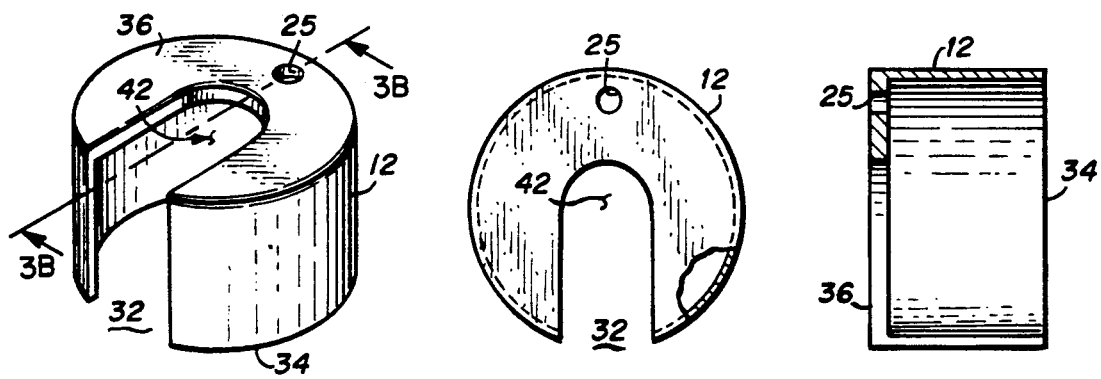
FIG. 2 is perspective view of the safety cover of the apparatus of FIG. 1.
FIG. 3A and FIG. 3B are, respectfully, top and cross-sectional side views of the safety cover of FIG. 2 with the view of FIG. 3B taken along the line 3B—3B of FIG. 2.

FIG. 2, FIGS. 3A and 3B further illustrate that the safety cover 12 which is semicircular with a hollow internal space 32 for receiving and covering the disconnect 13 and/or the valve 14 therein. The safety cover 12 has an open end 34 and an attachement end 36 opposite the open end 34. The attachment end 36 has the threaded bore 25 to engage and securely attach to the extending arm 22. The attachment end 36 further has a downward U-shaped opening 42 to fit around the pigtail pipe 28 thereby allowing free lateral movement of the safety cover 12 along the pigtail pipe 28. The safety cover has a rotational freedom around the extending arm 22 provided by the attachment between the attachment end 36 and the threaded bore 25. Depending on the application, the safety cover 12 can be rotated such that the U-shaped opening 42 is aligned horizontally whereby the position of the vale disconnect 13 and/or the valve 14 can be visually inspected. The open end 34 is disposed on the opposite end of the semicircular safety cover 12 which is a complete open end as shown. Depending on the application, the open end 34 can be expanded to comprise a larger semi-circular cover (not shown) to simultaneously cover the valve 14 when the spring extending means 22 is in its extended position such that both the disconnect 13 and the valve 14 are protected by the safety apparatus 10.

Figures 4A, 4B:
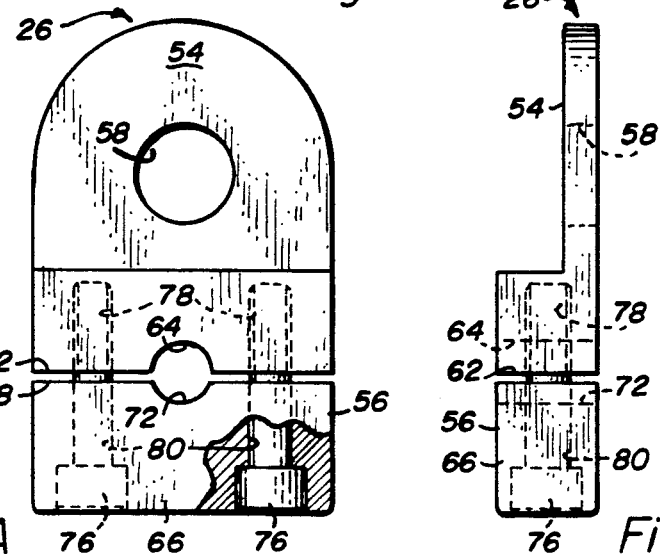
FIG. 4A and FIG. 4B are, respectfully, front and side views of a pipe fixture plate of the apparatus of FIG. 1.

FIGS. 4A and 4B show a front view and a side view of the pipe fixture plate 26. The pipe fixture plate 26 has an upper plate segment 54 and a lower plate segment 56. The upper plate segment 54 has a passage-hole 58 for receiving and supporting the pneumatic cylinder 16. A nut 59 engages a threaded end of the pneumatic cylinder 16 to lock the cylinder 16 securely in place to the plate segment 54 (FIG. 1) A bottom edge 62 of the upper plate segment 54 includes a first semi-circular pipe fitting concave opening 64. The lower plate segment 56 has a pipe-fitting edge 68 with a second pipe-fitting semi-circular concave opening 72. The first and the second pipe-fitting concave openings 64 and 72 face each other to circumferentially surround the pigtail pipe 28.

A clamping means clamps the upper plate segment 54 to the lower plate segment 56 to securely attach the safety apparatus 10 to the pigtail pipe 28 near the disconnect 13. The clamping means includes a pair of threaded screws 76 and a pair of threaded bores 78 in the upper plate segment 54, and a pair of bores 80 in the lower plate segment 56. The pair of threaded screws 76 are positioned in the bores 80 and threaded in the bores 78 to secure the upper and lower plate segments 54 and 56 together around the pipe 28.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A safety apparatus comprising:

a covering means for covering a disconnect valve means;

an urging means disposed near said covering means for extending the covering means to a first position to cover said disconnect valve means, the urging means further having a retraction mechanism for automatically retracting the covering means from said first position to a second position only when an external retracting command activates a retracting force on said retraction mechanism whereby said disconnect valve means is covered by the covering means in said first position by said urging means and is exposed in said second position solely by said retraction mechanism.

2. The safety apparatus of claim 1 wherein:

the urging means is a pneumatic cylinder including a spring extending means and a pneumatic line, said spring extending means extending and urging said covering means to said first position and said cylinder retracting said cover responsive to an appropriate pneumatic gas flow through said pneumatic line.

3. The safety apparatus of claim 2 wherein:

said pneumatic line is connected to and controlled by a gas system controller whereby said spring extending means of said pneumatic cylinder retracts only upon receiving said controlled pneumatic gas flow through said pneumatic line.

4. The safety apparatus of claim 3 wherein:

said covering means is an elongated cylindrical safety cover connected to an arm of said spring extending means of said pneumatic cylinder.

5. The safety apparatus of claim 4 wherein:

said cylindrical safety cover includes a threaded opening and said arm includes a corresponding threaded end whereby said safety cover can be securely screwed on to said arm.

6. The safety apparatus of claim 1 further comprises:

a pipe fixture means for securely attaching the safety apparatus to a gas pipe extending to said disconnect valve means.

7. The safety apparatus of claim 6 wherein the pipe fixture means including:

a first attachment means for securely attaching to the safety apparatus;

a second attachment means for securely attaching to said gas pipe; and a clamp means for securely connecting said first attachment means and said second attachment means whereby the safety apparatus is securely attached to said gas pipe.

8. The safety apparatus of claim 7 wherein:

said first attachment means is a first plate including a passage-hole of the shape and dimensions for allowing passage of said retraction mechanism through said passage-hole while securely holding said retraction mechanism, said first plate further including a first pipe attachment edge opposite from said passage-hole and having a first concave opening; and said second attachment means is a second plate including a second pipe attachment edge having a second concave opening corresponding to said first concave opening whereby said first and said second concave openings can flexibly and oppositely fit to said gas pipe thereby allowing said clamp means to securely connect said first and said second rectangular plates.

9. A safety apparatus comprising:

an elongated cylindrical safety cover for covering a disconnect valve means;

a pneumatic cylinder including a spring extending means and a pneumatic line, said spring extending means extending to and urging said safety cover to a first position to cover said disconnect valve means, said pneumatic line is connected to and controlled by a gas source and said spring extending means of said pneumatic cylinder retracts only upon receiving an external retracting command from said controller and activating said gas source to cause pneumatic gas to flow through said pneumatic line valve means or moving said safety cover from over said disconnect valve means and is prevented from being inadvertently retracted during a system failure an unsafe operation condition;

a pipe fixture means for securely attaching the safety apparatus to a gas pipe near said valve, the pipe fixture means including a first plate including a passage-hole with substantially the same shape and dimensions of and allowing passage of said retracting means through said passage-hole whereby securely holding said retracting means circumferentially, said first plate further including a first pipe attachment edge opposite said passage-hole having a first concave opening;

the pipe fixture means further including a second plate having a a second pipe attachment edge having a second concave opening corresponding to said first concave opening whereby said first and said second concave openings can flexibly and oppositely fit to a gas pipe; and the pipe fixture means further including a clamp means for securely connecting said first plate and said second plate.

* * * * *